United States Patent

Horie et al.

[11] Patent Number: 5,179,269
[45] Date of Patent: Jan. 12, 1993

[54] BAR CODE READER HAVING AN AUTOMATICALLY ACTUATED VISIBLE LIGHT LASER BEAM

[75] Inventors: Mikio Horie; Mitsunori Iima, both of Tokyo, Japan

[73] Assignee: Asahi Kogaku Kogyo Kabushiki Kaisha, Tokyo, Japan

[21] Appl. No.: 485,511

[22] Filed: Feb. 27, 1990

[30] Foreign Application Priority Data

Mar. 1, 1989 [JP] Japan .................................. 1-23463
Mar. 7, 1989 [JP] Japan .................................. 1-25797

[51] Int. Cl.⁵ .......................... G06K 7/10; G01J 1/32; H01J 40/14; H01S 3/10
[52] U.S. Cl. .................... 235/455; 235/462; 250/205; 250/208.4; 372/25
[58] Field of Search .................... 235/455, 462; 250/370.15, 208.4, 205; 372/25

[56] References Cited

U.S. PATENT DOCUMENTS

| | | | |
|---|---|---|---|
| 3,925,639 | 12/1975 | Hester | 235/462 |
| 4,240,064 | 12/1980 | DevChoudhury | 235/462 |
| 4,250,526 | 2/1981 | Fuwa et al. | 235/455 |
| 4,365,323 | 12/1982 | Heemskerk et al. | 369/44 |
| 4,488,042 | 12/1984 | Clay et al. | 250/235 |
| 4,538,060 | 8/1985 | Sakai et al. | 235/472 |
| 4,539,482 | 9/1985 | Nose | 250/578 |
| 4,567,360 | 1/1986 | Yamada | 235/455 |
| 4,639,606 | 1/1987 | Boles et al. | 235/455 |
| 4,678,288 | 7/1987 | Lonsdale et al. | 250/432 |
| 4,682,016 | 7/1987 | Inoue | 235/462 |
| 4,760,609 | 7/1988 | Tamagaki | 235/455 |
| 4,806,774 | 2/1989 | Lin et al. | 250/550 |
| 4,820,010 | 4/1989 | Scifres et al. | 350/96.15 |
| 4,845,349 | 7/1989 | Cherry | 235/462 |
| 4,933,538 | 6/1990 | Heiman et al. | 235/462 |

FOREIGN PATENT DOCUMENTS 62-53751 4/1987 Japan .
62-53752 4/1987 Japan .
63-46586 2/1988 Japan .

OTHER PUBLICATIONS

English Translation of the Claim of Japanese Patent Document 62-53751.
English Translation of the Claim of Japanese Patent Document 62-53752.

Primary Examiner—Eugene R. LaRoche
Assistant Examiner—Christopher R. Glembocki
Attorney, Agent, or Firm—Sandler, Greenblum & Bernstein

[57] ABSTRACT

A wand type bar code reader has a semiconductor laser which emits a visible laser beam in order to read bar code information of an object based on scanning of the visible laser beam and a control and drive circuit which controls the semiconductor laser, whereby the semiconductor laser is automatically repeated ON and OFF at predetermined time intervals.

4 Claims, 5 Drawing Sheets

BAR CODE READER HAVING AN AUTOMATICALLY ACTUATED VISIBLE LIGHT LASER BEAM

BACKGROUND OF THE INVENTION

1. Field of the Invention

This invention relates to a wand type bar code reader for reading bar code information by scanning an object with a visible laser beam emitted from a semiconductor laser.

2. Description of the Prior Art

Heretofore, so-called wand type (pen type) bar code readers have been known. An optical system of a conventional wand type bar code reader 1 is constructed as schematically shown in FIG. 8. In FIG. 8, the reference character 1a denotes a pen casing of the wand type bar code reader 1. A light emitting diode (LED) 2 and the photo detector 3 are disposed within the pen casing 1a. The pen casing 1 is provided at its tip with an optical condenser 4. The wand type bar code reader 1 contacts the object when scanning. A bar code pattern is printed on the object. An illuminating light to be emitted from the LED 2 illuminates a bar code pattern through the optical condenser 4 and the illuminating light is reflected by the bar code pattern. The reflected light is guided again into the pen casing 1a through the optical condenses (focus lens) 4. The wand type bar code reader 1 has an optical fiber 5 here and the reflected light is guided to the photo detector 3 through the optical fiber 5. The information on the bar code pattern is read based on the change in the reflected quantity of light guided to the photo detector 3.

However, a shortcoming of this conventional wand type bar code reader is that the readable range is extremely narrow. Therefore, if the surface of the object has large irregularities, the reading of the information on the bar code pattern becomes impossible because the change in distance between the surface of the object and the converging lens 4 is large.

SUMMARY OF THE INVENTION

An object of a first aspect of the present invention is to provide a wand type bar code reader which includes a control and drive circuit for automatically and repeatedly turning on and off a visible light emitting type semiconductor laser at predetermined time interval, when a visible light emitting type semiconductor laser is used.

According to the first aspect of the invention, because the visible light emitting type semiconductor laser is automatically and repeatedly turned on and off at predetermined time intervals, thermorunaway and thermal breakdown can be more effectively prevented as compared with a case where the visible light emitting type semiconductor laser is continuously driven.

That is, if the readable range of the optical system of the wand type bar code reader is made wide by using a conventional infrared light emitting type semiconductor laser and scanning the object in a noncontacted state to read the information on the bar code, the part of the object being scanned by the laser beam cannot be recognized.

However, according to this invention, the part of the object being scanned by the laser beam can be seen and recognized, even if the bar code pattern is read by scanning the object in a noncontacted state, because a visible light emitting type semiconductor laser is used.

Even if this visible light emitting type semiconductor has a large heating value and a defect which causes thermorunaway, this defect can be overcome, because the semiconductor laser is automatically repeatedly turned on and off at predetermined time intervals, while taking into consideration the cooling period of semiconductor laser.

An object of a second aspect of the invention is to provide a wand type bar code reader which includes a control and drive circuit for automatically repeatedly turned on and off a semiconductor laser at predetermined time intervals by changing at least the off time interval of a visible light emitting type semiconductor laser, depending on whether bar code information is read or not.

According to a second aspect of the invention, the bar code reader becomes easy to use because it is designed such that thermorunaway and thermal breakdown can be prevented by automatically repeatedly turning on and off the visible light emitting type semiconductor laser at predetermined time intervals, and the time interval for turning the semiconductor laser on and off is changed depending on whether the bar code information is read or not.

That is, if the on-time interval is equal to the off-time interval, the bar code information may not be read because the semiconductor laser is in its off-time interval when one needs to read the bar code information successively. Accordingly, frequently the bar code information cannot be read in a case in which one needs to read the bar code information successively.

However, according to the present invention, when the bar code information is correctly decoded, the semiconductor laser is immediately turned off and cooled so as to be ready for the next reading. On the other hand, when decoding is incorrectly performed, as the driving time of the semiconductor becomes longer to that extent, the cooling time for the semiconductor laser is made correspondingly longer.

DETAILED DESCRIPTION OF THE PREFERRED EMBODIMENTS

(1) Optical System of a Pen Casing of a Wand Type Bar Code Reader

Figure 2:
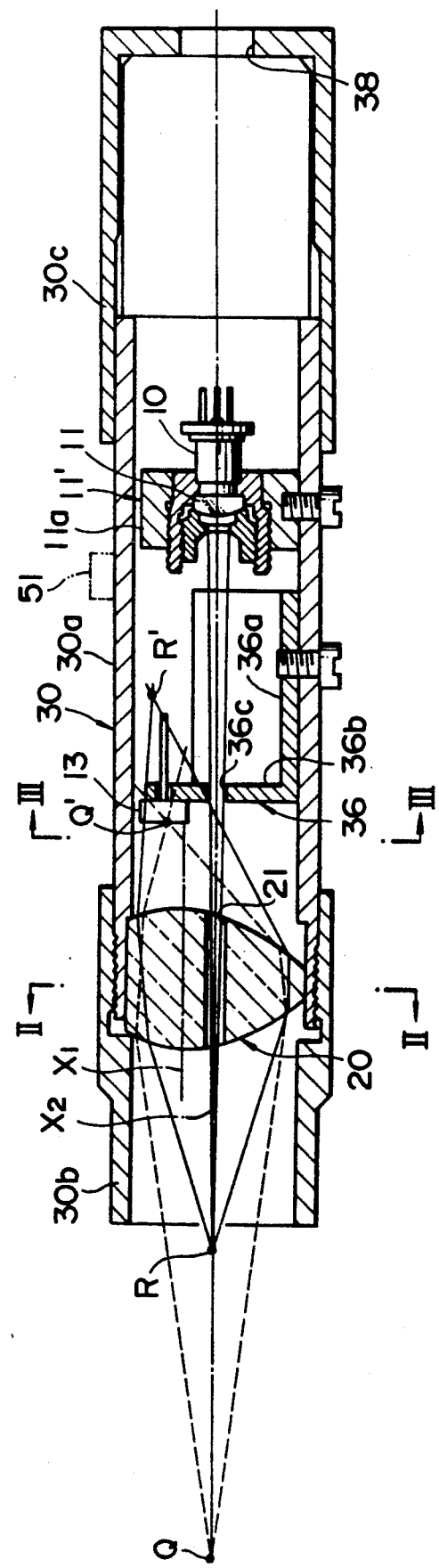
FIG. 2 is a sectional view showing an internal construction of a pen casing of the wand type bar code reader, according to the present invention.

In FIG. 2, the numeral 10 denotes a visible light emitting type semiconductor laser, and 11 denotes a projecting lens. The semiconductor laser 10 and the projecting lens 11 constitute a light projecting portion 11'. This light projecting portion 11' is designed such that the beam diameter for reading a bar code pattern of an object, as will be described hereinafter, is maintained in a section q–r, the beam waist is being between limiting points Q and R. The visible laser beam, which is reflected by the object, is condensed to a photo detector 13 through a converging lens 20. At this time, the reflected light from limiting points Q and R on the side of the object are condensed to positions Q' and R' respectively through the converging lens 20.

A light receiving surface of the photo detector 13 is located at the point Q', which is conjugate with the distant limiting point Q within a readable range, in order to uniformly read the reflected light from objects which are located at the limiting points Q and R of the readable range.

In other words, the light quantity level of the reflected light is in inverse proportion to the second power of the distance to the object from the photo detector 13.

Therefore, by locating the photo detector 13 in such a position so as to most effectively condense the reflected light from the distance limiting point Q within the readable range, and scattering the reflected light from the near limiting point R, the reflected light received by the photo detector 13 can be optically uniform over the entire reading range.

Figure 3:
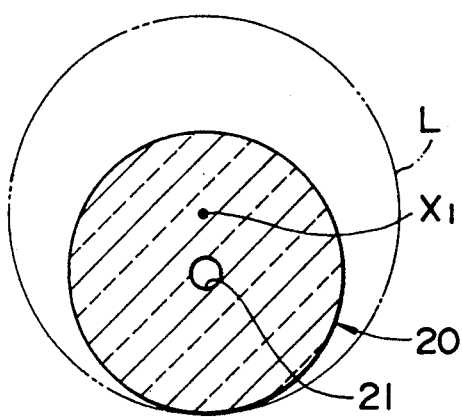
FIG. 3 is a sectional view taken on line II—II of FIG. 2.

The converging lens 20 is a rotary asymmetrical lens. This converging lens 20 is formed by cutting a rotary symmetrical imaginary lens L (its outer diameter being shown by two dotted chain lines in FIG. 3) such that its center axis is in a position which is off-set from its optical axis x1. The axis x1 of the converging lens 20 is shifted in parallel relation with the optical axis x2 of a light projecting portion 11'. The imaginary lens L, as the "mother" of the converging lens 20, is an aspherical lens, the radius of curvature of which gradually increases as it goes toward the periphery from the center.

Therefore, the converging lens 20 according to this embodiment is an aspherical lens the radius of curvature of which is gradually increased as it goes toward the periphery. By this, the focal length of the converging lens 20 can be made short and a sufficient thickness of the peripheral portion of the lens can be obtained. A through hole 21 through which passes the laser beam emitted from the light projecting portion 11' is formed in the center axis of the converging lens 20.

The visible laser beam emitted from the semiconductor laser 10 is made into a convergent light beam by the projecting lens 11, the visible laser beam converged through a through hole 21. The visible laser beam being is reflected by an object placed between the limiting points Q–R. The reflected light is guided to the converging lens 20 and condensed to the photo detector 13. Regarding the object with a predetermined standard bar code pattern printed thereon, as long as the object is situated between the limiting points Q–R, information can be read even when it is closely contacted with an opening of the pen casing 30.

In this embodiment, when a standard bar code pattern having a smaller spatial frequency (coarse pattern) than the above-mentioned standard, the readable range is wider than the limiting points Q–R and when a standard bar code pattern having a large spatial frequency (fine pattern) is read, the readable range becomes narrower than the limiting points Q–R. When the readable range is narrow, it becomes impossible to read the bar code information when the object is closely contacted with the opening. Therefore, if it is desired that several kinds of standard bar code patterns are to be read, it should be designed such that the near limiting points of the readable range corresponding to a bar code pattern having the largest spatial frequency among them is made coincident to the opening of the pen casing 30.

(2) Construction of the Pen Casing 30

The pen casing 30 comprises a pen barrel 30a, a front barrel 30b to be screwed with a tip of the pen barrel 30a, and a rear barrel 30c with a bottom to be screwed with a rear end of the pen barrel 30a.

Figure 4:
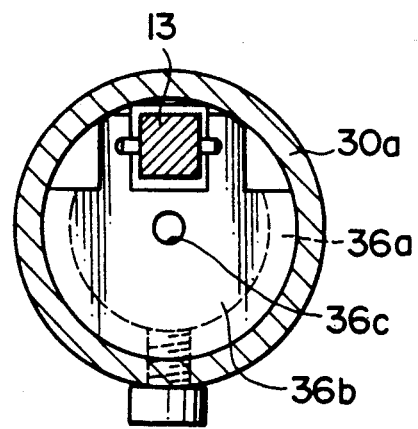
FIG. 4 is a sectional view taken on line III—III of FIG. 2.

The semiconductor laser 10 and the projecting lens 11 are fixed to a cylindrical holding frame 11a. The photo detector 13 is attached to an holding member 36. This holding member 36, as shown in FIG. 4, is formed of a semicylindrical portion 36a and a front wall 36b. The semicylindrical portion 36a is fixed to the pen barrel 30a by a screw means. The form of semicylindrical portion 36a is of similar form to the inner wall of the pen barrel 30a. A through hole 36c, in order to transmit a visible laser beam emitted from the semiconductor laser 10, is formed in the front wall 36b.

Figure 5:
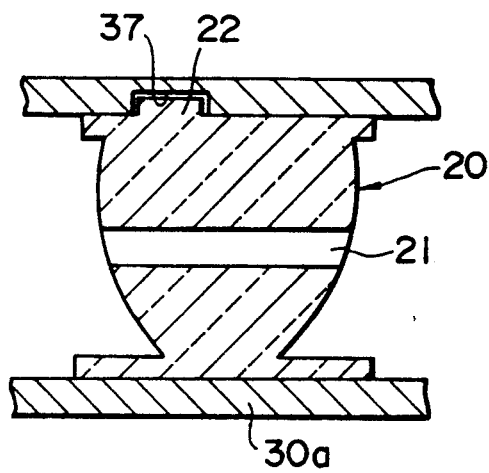
FIG. 5 is an enlarged view of a mounting portion of a converging lens of FIG. 2.
Figure 8:
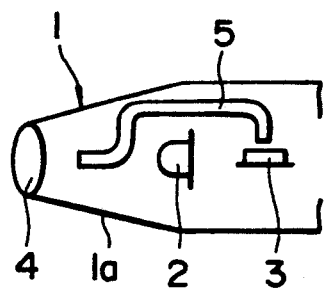
FIG. 8 is an illustration, schematically showing a pen casing of a conventional wand type bar code reader.

In order to mount the converging lens 20 to pen casing 30 so that a thick portion is up and a thin portion is down as shown in FIG. 5, a projection 22 is formed on a thick portion of the converging lens 20.

On the other hand, an engaging hole 37 is formed in the inner wall of the pen barrel 30a. By this, the positioning of the converging lens 20 is easy when the converging lens is mounted in the pen barrel 30a. A cord hole 38 is formed in the rear barrel 30c so that a cord interconnects the semiconductor laser 10 and a controller 40 (see FIG. 1) through a cord hole 38.

(3) Embodiment of a Circuit According to the First Invention

Figure 1:
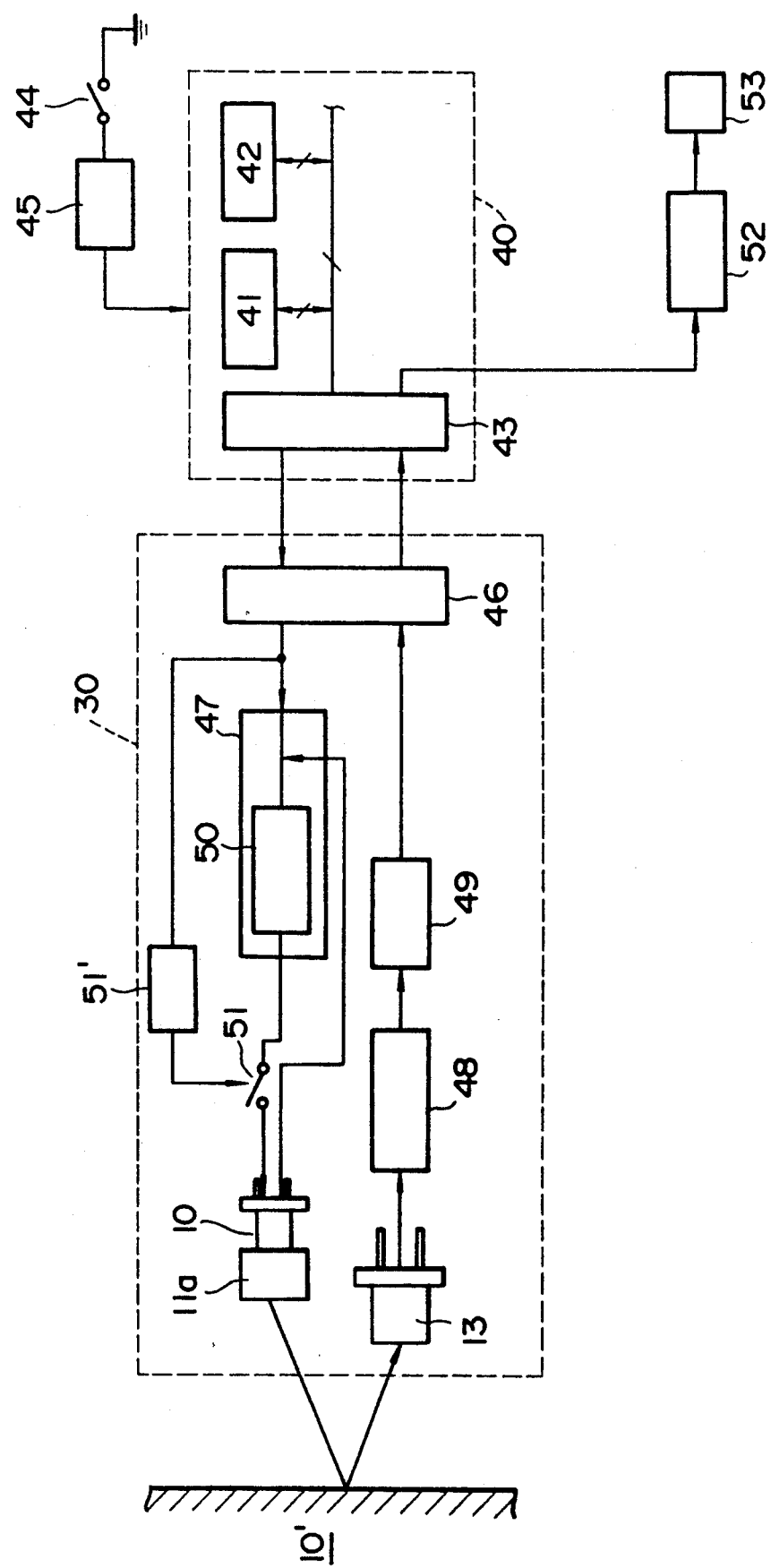
FIG. 1 is a block circuit diagram schematically showing an important portion of a wand type bar code reader, according to the first aspect of invention.

The wand type bar code reader, as schematically shown in FIG. 1, is controlled by the controller 40. The controller 40 includes a CPU 41, a ROM/RAM memory 42, and an interface 43. When a main switch 44 is turned on, electric power is supplied to the controller 40 from an electric power source 45.

A circuit board (not shown) is disposed within the pen barrel 30a. The circuit board is provided with an interface 46, a driving circuit portion 47, an amplifying circuit portion 48, and a binary circuit portion 49. The driving circuit portion 47 has an auto power control portion 50.

A switch 51 is disposed between the semiconductor laser 10 and the driving circuit portion 47. The switch 51 is automatically repeatedly turned on and off by a control and drive circuit 51'. When the main switch 44 is turned on, electric power is supplied to the control and drive circuit portion 51'. The control and drive circuit portion 51' repeats the action of turning on the switch 51 after a predetermined time (2 seconds in this embodiment) has passed and turning off the switch 51 after a predetermined time (two seconds in this embodiment) has passed.

Therefore, the semiconductor 10 repeats the action for lighting up and turning off by two seconds. The visible laser beam emitted from the semiconductor laser 10 is reflected on the object 10' having the bar code pattern printed thereon. The reflected light is received by the photo detector 13 and photoelectrically converted. The photoelectrically converted output power is amplified by the amplifying circuit 48 and made into a binary value by the binary circuit 49. The binary signal is input into the CPU 41 through the interfaces 46 and 43 and the binary signals are decoded by the CPU 41. By this, the bar code pattern is read. When the bar code pattern has been correctly read, a driver 52 is driven by the CPU 41. By this, a buzzer 53 generates a buzzer sound.

It is preferable that the predetermined time is set totally taking into consideration scanning speed of the pen type bar code reader, operating efficiency, cooling characteristics of the semiconductor laser and the like.

In the above-mentioned embodiment, the control and drive circuit 51' is used to automatically repeatedly turn on and off at predetermined time interval, so that the semiconductor laser 10 is intermittently emitted. However, it may be constructed such that the semiconductor 10 repeats the action of lighting up and turning off at predetermined time interval by using the CPU 41 and appropriate software instead of using switch 51.

The embodiment of a circuit according to the second invention shows one example of such construction as mentioned above.

(4) Embodiment of a Circuit According to the Second Invention

Figure 6:
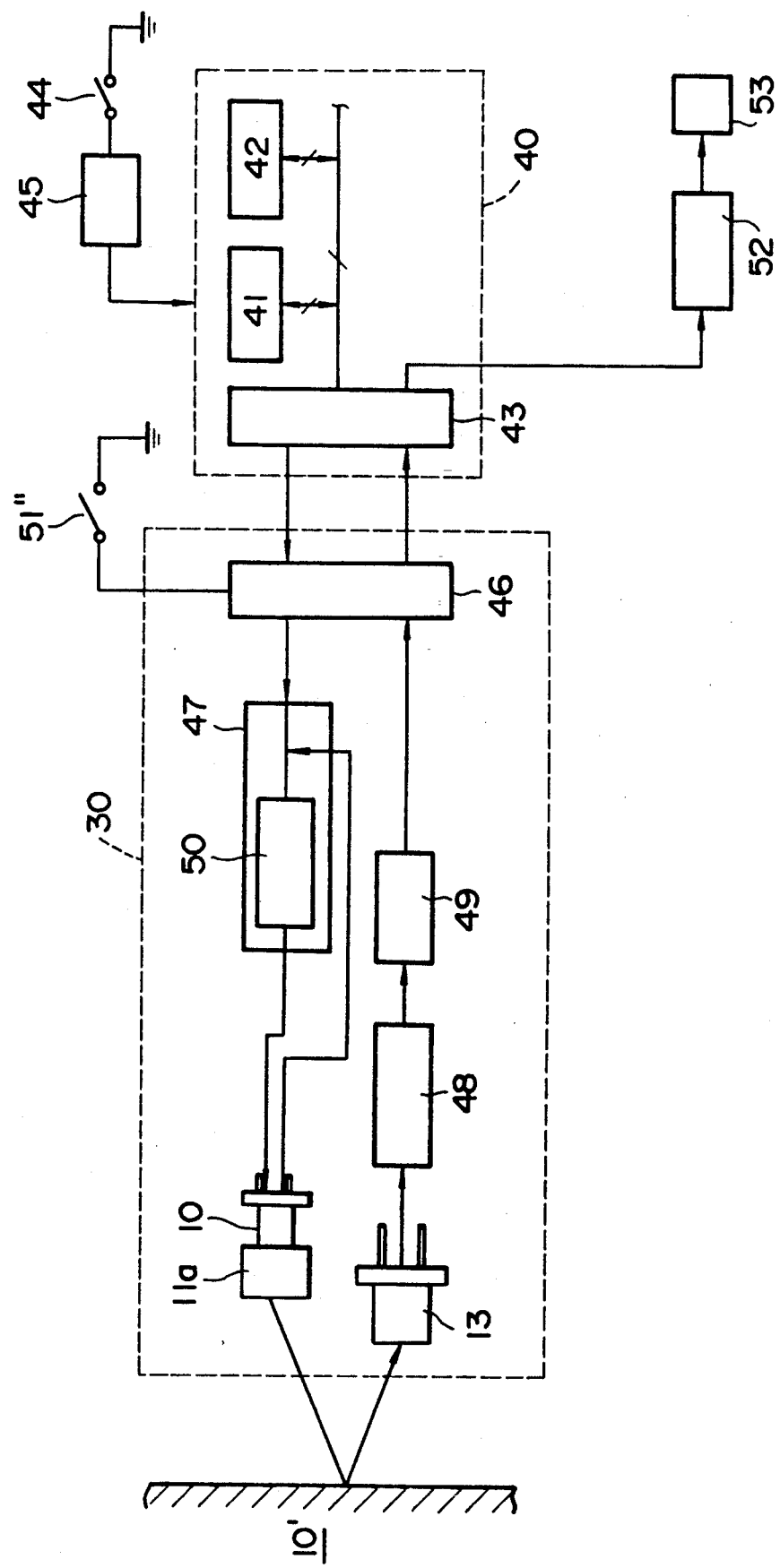
FIG. 6 is a block circuit diagram, schematically showing a wand type bar code reader, according to the second invention.

In this embodiment, as is shown in FIG. 6, the semiconductor laser 10 is turned on by a trigger switch 51''. When the trigger switch 51'' is turned on, the semiconductor 10 is automatically turned on and off by the CPU 41 as the control and drive circuit. The CPU 41 includes a one second timer OFF for maintaining the semiconductor laser 10 in its OFF position for one second, a two second timer OFF for maintaining the semiconductor laser 10 in its OFF position for two seconds, and a two second timer ON for maintaining the semiconductor laser in its ON position for two seconds.

Figure 7:
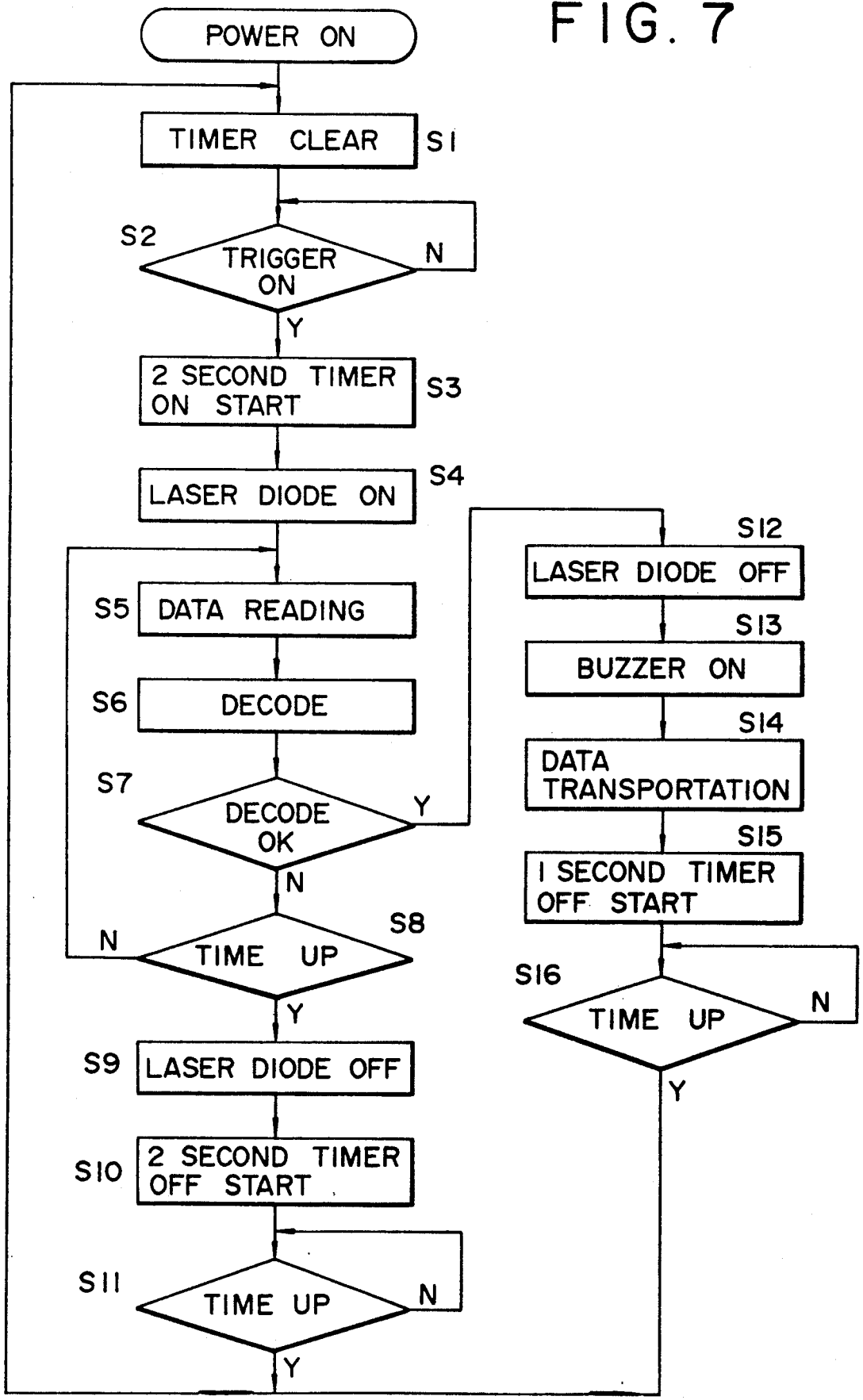
FIG. 7 is a flow chart for explaining the operation of the wand type bar code reader, according to the present invention.

The CPU 41, when power is on, clears all timers as shown in FIG. 7(Step S1). By this, the contents of the count of the one second timer OFF, the two second timer OFF and the two second timer ON are set to initial values. The CPU 41 judges whether the trigger switch 51 is turned on (Step S2). When the trigger switch 51 is OFF, Step S2 is repeated. When the trigger switch is ON, it goes to Step S3 where the second timer ON is started. Next, the semiconductor laser (laser diode) 10 is turned on (Step S4). By this, the semiconductor laser 10 is lighting up, and the visible laser beam is emitted from the semiconductor laser 10. The visible laser beam is reflected on the object 10' having the bar code pattern printed thereon. The reflected light is received by the photo detector 13 and photoelectrically converted. Such photoelectrically converted output power is amplified by the amplifying circuit 48 and made into a binary value by the binary circuit 49. The binary signal is input into the CPU 41 through the interfaces 46 and 43. The CPU 41 reads data (reading of the binary signal) (Step S5), then decodes the same (Step S6) and then it goes to Step S7.

In Step S7, it is judged whether the decoding is OK. If the decoding is not OK (for example, in the case where the object is not scanned when where the power is on, and in the case where the data has been read but the data is not correctly decoded), it goes to Step S8.

In Step S8, first, it is judged whether the two second timer ON is timed up. If the two second timer ON is not timed up, it repeats the procedure of Step S5 through Step S8. In Step S8, when the two second timer ON is timed up, the semiconductor laser 10 is turned off (Step S9). Next, the two second timer OFF is started (Step S10), and then it goes to Step S11 where it is judged whether the two second timer OFF is timed up. The judgment of Step S11 is repeated until the two second timer OFF is timed up. In Step S11, when the two second timer OFF is timed up, it goes to Step S1 where it repeats the procedure of Step S1 through Step S11. Therefore, when the trigger switch 51 is ON and the decoding is not OK, the semiconductor laser 10 repeats ON and OFF at predetermined time interval (two seconds in this embodiment).

When correctly decoded, it is judged as YES in Step S7. Next, the semiconductor laser 10 is turned off in Step S12 and then it goes to Step S13. In Step S13, the CPU 41 actuates the driver 54. By this the buzzer 53 generates a buzzer sound. Then, the CPU 41 transmits data to a display portion, a printer, or a host computer (Step S14) and then it goes to Step S15. In Step S15, the one second timer OFF is started.

And in Step S16, it is judged whether the one second timer OFF is timed up. And the procedure of Step S16 is repeated until the one second time OFF is timed up. When one second timer OFF is timed up in Step S16, it goes to Step S1. Therefore, when the decoding is correctly performed, the semiconductor laser 10 is turned off for one second immediately after the decoding and this procedure is repeated.

Thus, as the off time of the semiconductor in the case which the bar code information is continuously read becomes shorter than the off time interval of the semiconductor 10 in the case which the decoding of the bar code information is not normal or in the case which the reading is not performed, the semiconductor laser 10 is immediately turned on when the bar code information is to be read continuously and therefore very convenient.

In the above-mentioned embodiment, although the trigger switch 51 is mounted on the pen casing 30, it may be mounted on the controller 40. Further, although the CPU 41 is mounted on the controller 40 in this embodiment, it may be mounted on the pen casing 30. Furthermore, in the embodiment, although the buzzer 53 is mounted on the controller 40, the buzzer 53 may be mounted on the pen casing 30. In addition, in this embodiment, although the ON and OFF control of the semiconductor laser 10 can be performed by the trigger switch 51, this is not necessarily limited to the trigger switch 51.

What is claimed is:

1. A wand type bar code reader having:
    a semiconductor laser emitting a laser beam in order to read bar code information of an object based on scanning of said laser beam;
    a control and drive circuit which controls said semiconductor laser, whereby said semiconductor laser is automatically repeatedly turned ON and OFF;

said control and drive circuit turning said semiconductor laser OFF at once and prohibiting turning ON of said semiconductor laser until a first predetermined OFF time interval passes when data is read correctly, and turning said semiconductor laser OFF after a predetermined ON time interval passes and prohibiting turning ON of said semiconductor laser until a second predetermined OFF time interval passes when data is not read correctly in a predetermined ON time interval, said second predetermined OFF time interval being longer than said first predetermined OFF time interval.

2. A wand type bar code reader recited in claim 1, wherein said control and drive circuit is a CPU and said CPU is programmed so that said semiconductor laser is automatically turned ON and OFF at predetermined time interval.

3. A wand type bar code reader recited in claim 1, wherein said wand type bar code reader is not in contact against said object.

4. A wand type bar code reader recited in claim 2, wherein said wand type bar code reader has a driver for driving a buzzer, and said CPU controls said driver so as to drive said driver when said bar code is correctly read.

* * * * *

UNITED STATES PATENT AND TRADEMARK OFFICE
CERTIFICATE OF CORRECTION

PATENT NO. : 5,179,269
DATED : January 12, 1993
INVENTOR(S) : M. Horie, et. al.

It is certified that error appears in the above-indentified patent and that said Letters Patent is hereby corrected as shown below:

Column 8, line 5, change "interval" to --intervals--.

Signed and Sealed this

Twenty-second Day of February, 1994

Attest:

BRUCE LEHMAN

*Attesting Officer*  *Commissioner of Patents and Trademarks*